March 21, 1961 S. T. FREEMAN 2,976,417
DENTAL X-RAY DEVICE
Filed Dec. 24, 1959 3 Sheets-Sheet 2

INVENTOR.
STEPHEN T. FREEMAN
BY
*Zoltan Pholachik*
ATTORNEY

March 21, 1961 S. T. FREEMAN 2,976,417
DENTAL X-RAY DEVICE
Filed Dec. 24, 1959 3 Sheets-Sheet 3
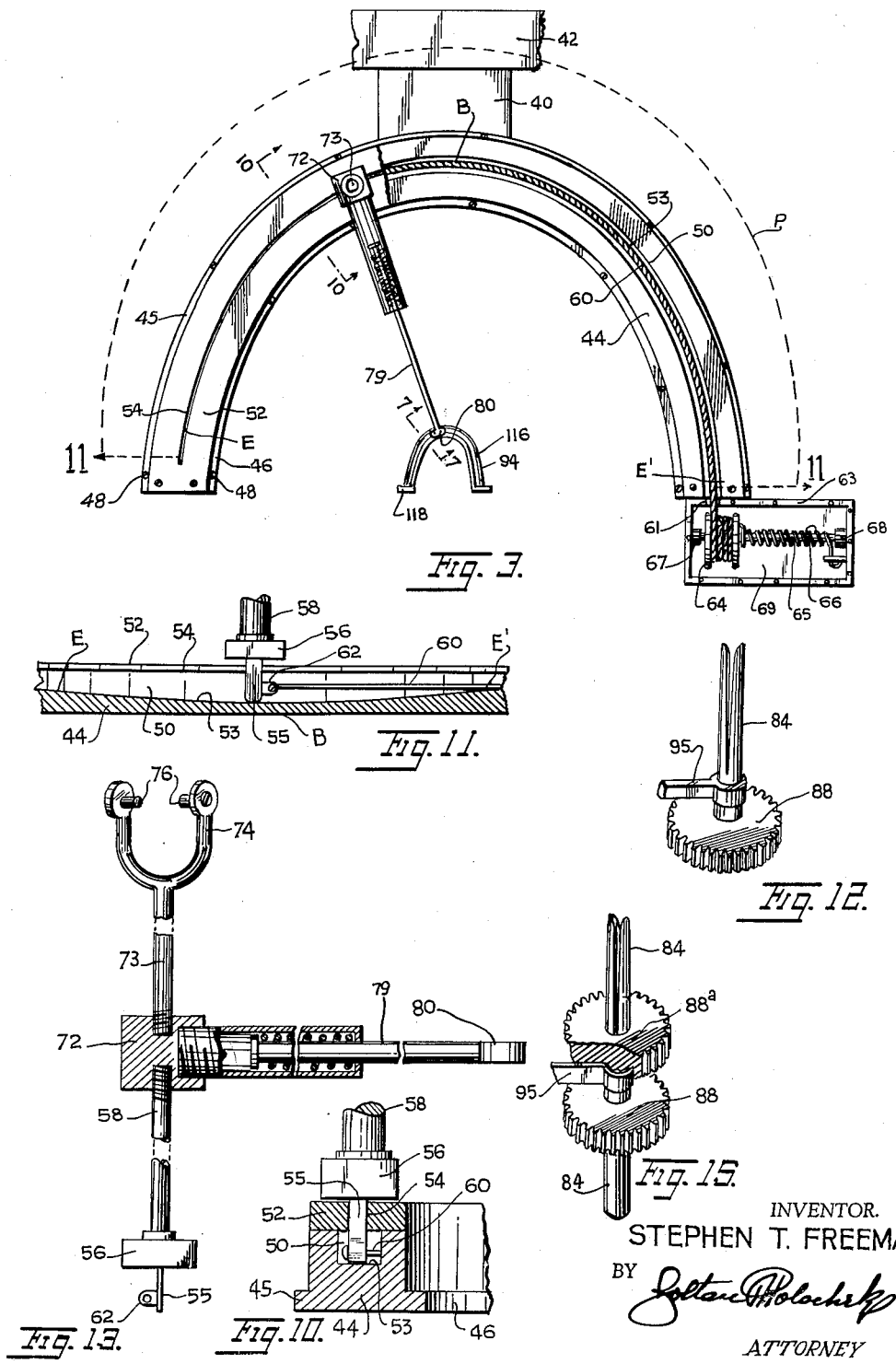
INVENTOR.
STEPHEN T. FREEMAN
BY 
ATTORNEY United States Patent Office 2,976,417
Patented Mar. 21, 1961

2,976,417
DENTAL X-RAY DEVICE
Stephan T. Freeman, 10 W. Fulton St., Gloversville, N.Y.
Filed Dec. 24, 1959, Ser. No. 861,923
15 Claims. (Cl. 250—65)

This invention relates to the art of dental X-ray machines, and more particularly to an improved X-ray film holding and reeling device to facilitate obtaining panoramic X-ray photographs or pictures of the teeth of a patient.

A principal object of the invention is to provide a device for taking X-ray pictures of teeth on a film mounted on reels within a closed casing disposed in a patient's mouth.

Another object is to provide a device for taking a panoramic X-ray shadow picture indicating the condition of every tooth in upper and lower jaws of a patient, the picture being taken on an automatically reeled film carried on a guide and carriage within the patient's mouth.

Another object is to provide a device of the character described for taking an X-ray photograph of an entire set of teeth, a part thereof, or even of a single tooth, upon a predetermined portion of a film strip, whereby X-ray radiation is reduced.

A still further object is to provide an improved X-ray film holding and feeding device for a dental X-ray machine.

Heretofore in the X-raying of teeth, considerable difficulty has been experienced in the handling of the X-ray film upon which the shadow pictures or photographs are made. Often it is required to photograph only a single tooth or group of teeth. The procedure generally used heretofore has been to insert a single piece or strip of film in a patient's mouth behind the tooth or teeth to be photographed, and to X-ray the teeth while the patient holds the film in place in his mouth. This has proven to be awkward, unsanitary, and undesirable in practice. It has been known heretofore to employ a film strip which is inserted into a patient's mouth behind the teeth. The film is held in place by an external band which is secured to the patient's face by adhesive strips. Such a film holding arrangement has many disadvantages. It is difficult to insert in position properly. Securing of adhesive strips to a patient's face is objectionable because of the difficulty of removal and because tension and pain are caused the patient. Where timid persons, children, etc., are to be X-rayed, the prior known crude means for handling the X-ray film renders the entire procedure very difficult and often impossible to perform satisfactorily.

Often as many as fifteen pictures or photographs are taken before the X-raying operation is completed. During the taking of each picture, several teeth are exposed to the rays of the machine and during the course of the entire operation, when taking the adjacent section of the patient's mouth, the teeth are subjected to repeated exposure of the rays.

The present invention is directed at overcoming the foregoing and other difficulties and disadvantages of prior known X-ray film handling means for dental X-ray machines by providing a moving narrow beam which will take the section of the tooth only once, never exposing the teeth twice to the X-ray radiation. This invention includes a device which is operatively associated with the X-ray machine to the extent that it tilts the projector for optimum exposure of the teeth. Means are provided to drive a film from one reel and winds it up on another each time the X-ray projector of the machine moves to another position to take a picture. A U-shaped track is provided which fits into a patient's mouth and is held in place between his closed teeth. On the track is mounted a carriage which is moved around the track by an externally located cam guide. A container of film is removably mounted on the carriage. Within the container are two reels. The reels are turned to transfer from one to the other the film being exposed to the X-rays from the projector of the X-ray machine. When exposure is completed, the film container can be easily removed from the carriage without possible exposure of the film to light. The device avoids danger of exposure of the patient or of the attending technician, dentist, or other personnel, to stray X-ray radiation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a top plan view of the device per se, parts being broken away.

Fig. 4 is a top plan view on an enlarged scale of the film holder, carriage and track shown disposed on the lower jaw of the patient, the view being taken on line 4—4 of Fig. 1.

Fig. 5 is a fragmentary side elevational view on an enlarged scale of a portion of the X-ray projector apparatus and a tilting yoke made according to the invention, a portion of an X-ray cone employed in the apparatus being broken away.

Fig. 6 is a sectional view taken on line 6—6 of Fig. 5.

Fig. 7 is a sectional view on an enlarged scale taken on line 7—7 of Fig. 3.

Fig. 10 is a fragmentary sectional view on an enlarged scale taken on line 10—10 of Fig. 3.

Fig. 11 is an arcuate sectional view on a somewhat reduced scale taken on line 11—11 of the cam guide of Fig. 3.

Fig. 12 is a perspective view of a drive gear and drive spindle for a film reel employed in the device.

Fig. 13 is a part elevational and part sectional view of a cam follower, yoke, and carriage drive bar, parts being broken away.

Fig. 15 is a perspective view similar to Fig. 12 of a modified drive gear and spindle assembly.

Figure 1:
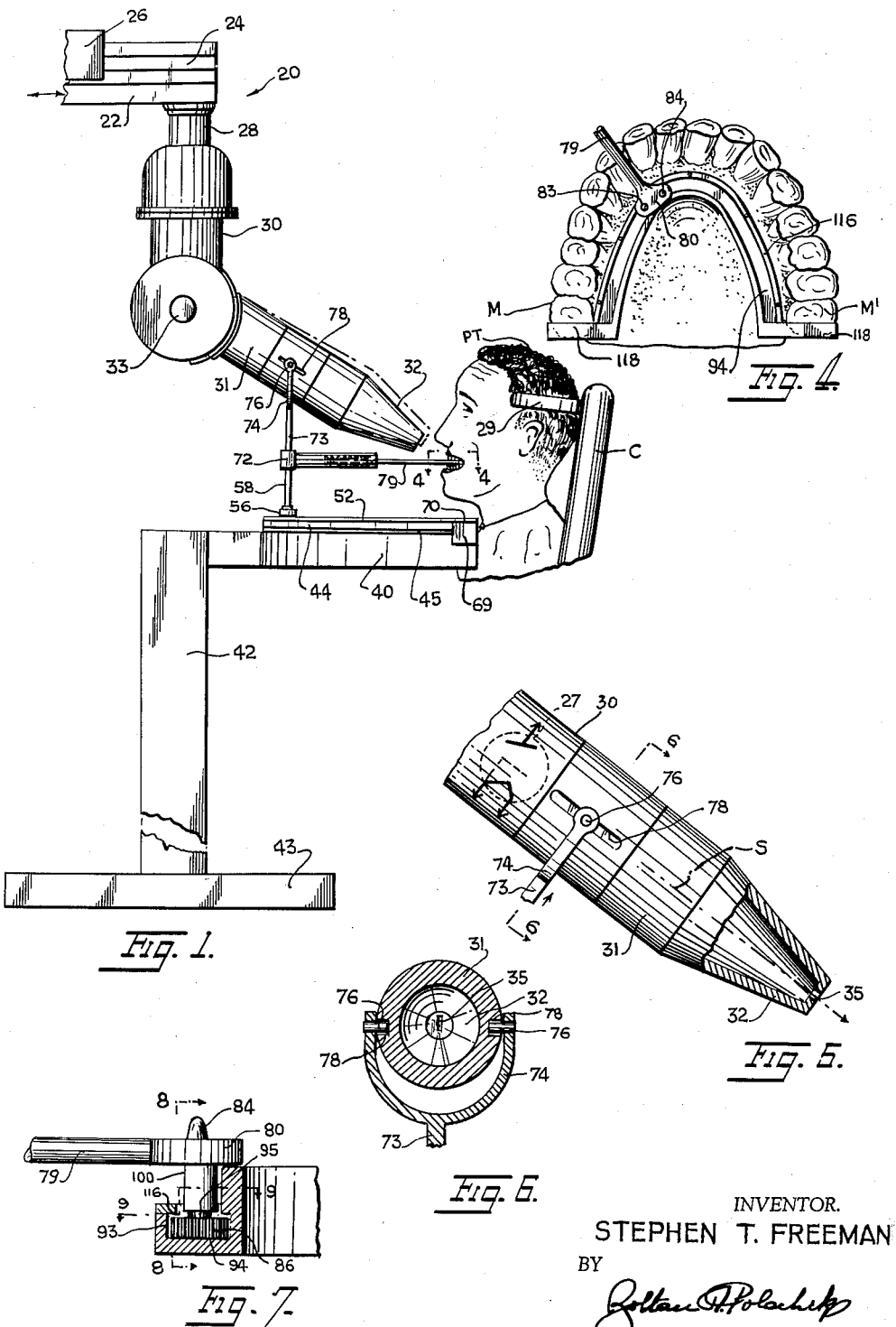
Fig. 1 is a side elevational view of a device embodying the invention, shown in position for use in X-ray photographing of a patient's teeth, parts being broken away.
Figure 2:
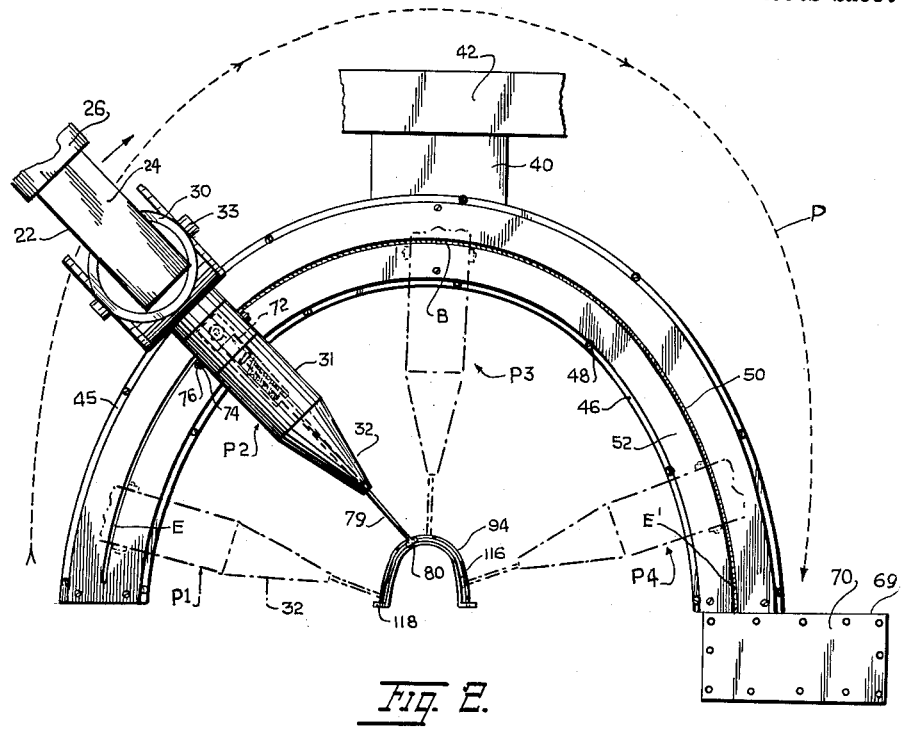
Fig. 2 is a top plan view of the device with associated X-ray projection apparatus, the projection apparatus being shown in various moved positions in dot-dash lines.

In Fig. 1 there is shown an X-ray projection machine 20 including a carriage 22 having a rail 24 engaged in a support or head 26. Suspended from the carriage 22 is a post 28 carrying a cylindrical enclosure 30 for an X-ray tube 27. A projection tube 31 and cone 32 are pivotally mounted on a horizontal shaft 33 for elevating and lowering the cone in azimuth around shaft 33 as an axis. The carriage 22 and its support are movable in a U-shaped path P as indicated in Fig. 2. In all positions P1–P4 of the carriage, the forward end of the cone 32 will be directed toward the mouth of the patient PT seated in a dental chair C. The patient's head is held stationary by clamp fingers 29. The X-ray tube 34 is indicated schematically at 27 in Fig. 5. The tube emits X-rays which pass along a line of sight S and through a narrow slit 35 formed in the front end of the cone 32.

To the extent described the X-ray machine is entirely conventional. Such a machine is described in Patent No. 2,476,776 to Smathers. This type of machine is equipped to move the cone in the U-shaped path P for taking a panoramic X-ray shadow photograph of the patient's entire denture including upper and lower teeth and associated jaw structure. The present invention is directed at the structure associated with the X-ray machine and shown in the drawings, as will now be described.

The device embodying the invention includes a table 40 carried on a post 42 mounted on a base 43. On the table is a U-shaped or semi-circular guide bar 44 having base flanges 45, 46 secured to table 40 by bolts 48. As best shown in Figs. 10 and 11, bar 44 is formed with a central longitudinal groove 50. On top of the bar is mounted a U-shaped plate 52 having a central slot 54. The width of the slot 54 is less than the width of groove 50 so that portions of the plate 52 overlie the groove as best shown in Fig. 10. The bottom 53 of the groove is lowest or deepest at the center B of the bight of the bar as indicated in Fig. 11 and the ends E, E' of the groove 50 are highest or shallowest in depth. The bottom 53 is smoothly curved and concave. The curvature developed in elevation as shown in Fig. 11 is approximately that of the surface of a right cylinder of larger diameter. The bar 44 serves as a cam for guiding a flat cam follower finger 55. This finger is secured to and depends from a base block 56 formed on a rod 58. The finger extends through the slot 54 and its curved end rides on the bottom 53 of groove 50. As a result, the rod 58 is gradually lowered in traveling from one end of the groove 50 to the center B and is gradually raised in moving from the center B to the other end of the groove.

A flexible steel cable 60 is secured to a lug 62 attached to finger 55. This cable terminates on a pulley 64 best shown in Fig. 3. The pulley is carried on a shaft 65 on which is a coil spring 66. The shaft is journaled in bearings 67, 68 mounted on the ends of a bearing box 69. A removable cover 70 is provided for the box. The spring 66 is wound so that it has maximum tension when the rod 58 is located at the left end E of groove 50, and cable 60 is withdrawn to maximum extent from box 69. When the rod 58 is at the right end E' of the groove the cable 60 is almost fully wound up on the pulley 64. Cable 60 passes through a slot 61 in side wall 63 of the box 69.

It is to be understood that instead of a spring drive, any other suitable driving means may be used such as an electric motor or the like.

A coupling block 72 is secured to the rod 58; see Fig. 13. Extending upwardly from the rod is the shank 73 of a yoke 74. The yoke is U-shaped and carries aligned pins 76 at the ends of its arms. These pins fit into grooves 78 formed in the sides of the cylindrical enclosure 30; see Figs. 5 and 6. As the rod 58 is carried around the groove in bar 44, the yoke is gradually lowered and then raised. This causes the tubular enclosure 30 and cone 32 to be tilted through various vertical angles ranging from about 50° to the horizontal plane at maximum tilt at the center or B position of bar 44 to about 30° at the end positions E and E' at the ends of the bar.

Figure 8:
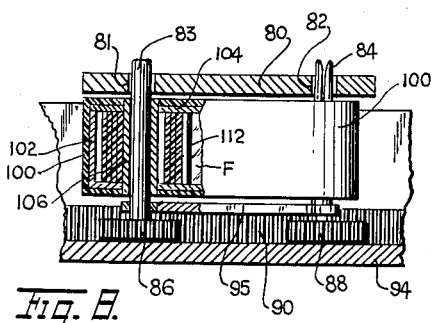
Fig. 8 is a vertical sectional view on an enlarged scale taken on line 8—8 of Fig. 7, parts being broken away.
Figure 9:
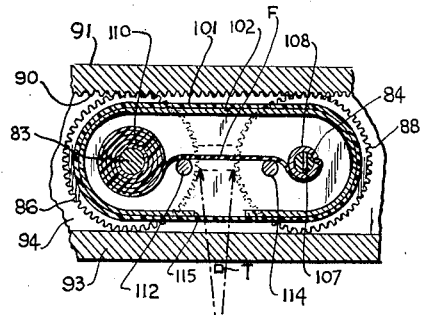
Fig. 9 is a horizontal sectional view taken on line 9—9 of Fig. 7.

Extending laterally from block 72 is a rod or bar 79; see Figs. 1–3 and 13. At the outer end of this bar is a plate 80 having two spaced holes 81, 82; see Fig. 8. In these holes fit the upper ends of shafts 83 and 84. The shafts are secured at their lower ends to gears 86, 88 which are meshed with a rack gear 90. The gear 90 is formed on one side wall 91 of a U-shaped track 94. The other wall 93 of the track is smooth; see Figs. 7 and 9. A coupling bar 95 is mounted on the two shafts 83, 84 and holds them in predetermined spacing while permitting the shafts to rotate, as the gears 86, 88 move along the track 94 in engagement with the rack gear 90.

Shaft 83 is a solid cylindrical member. Shaft 84 is split to provide two fingers; see Fig. 12. A container 100 of X-ray film may be removably disposed on the shafts 83, 84.

Figure 14:
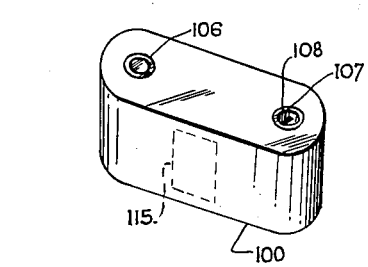
Fig. 14 is a perspective view of a film container.

Container 100 is a small closed box having a wrapper 101 made of paper or thin plastic material transparent to X-rays, but opaque to light rays such as daylight, incandescent light, and the like. Within this box is a shell 102 made of lead foil or sheet lead. The shell may be provided with a removable top plate 104. Rotatably mounted in the box between upper and lower walls thereof are two cylindrical reels 106 and 108; see Figs. 8, 9 and 14. Reel 106 is a supply reel and carries a rolled up strip 110 of X-ray film. This film may be about four inches in width. Reel 108 is a takeup reel. Guide pins 112 and 114 insure a straight traverse portion F of the film between reels. The film portion F is located at a space or opening 115 formed in one side of shell 102 to permit exposure of the film to X-rays passing through a tooth T (Fig. 9) when emitted through slit 35 in the projection cone. Pin 107 in reel 108 engages between the fingers of shaft 84.

The container 100 can readily be inserted on and removed from the upwardly extending shafts 83 and 84. Plate 80 is fitted over the upper ends of the shafts. The gears 86, 88 attached to the shafts always remain in the track 94. A U-shaped flange plate 116 is removably secured over the top of outer wall 93 of the track. Plate 116 overhangs the track and prevents the gears from coming out of the track.

Flat lateral extensions 118 are formed at the free ends of the track 94 for overlying the bottom end molars M and M' of the patient PT; see Fig. 4. When the teeth of the patient are closed, the upper and lower end molars M, M' grip the extensions 118 which space the upper and lower teeth apart sufficiently so that the bar 78 can move freely in a horizontal plane between the upper and lower teeth. Bar 78 is necessarily thinner than extensions 118 for this purpose.

In operation of the device, the several components are arranged as shown in Fig. 1. The carriage 22 will be driven in a U-shaped path P in conventional manner. A cycle of operation of the device will be described starting with the cone 32 in position P1 (Fig. 2). In this position of the projection cone, the rod 58 is in elevated position and the axis of the cone is about 30° to a horizontal plane. Spring 66 is tensioned on shaft 65 and the cable 60 is drawn out to maximum extent. The slit 35 in cone 32 is aligned with the upper and lower molars M, M' at the left side of the patient's face. The film 110 is unwound sufficiently so that the film length F which occupies the space at opening 115 in shell 102 is ready for photographing the first tooth position. Bar 79 is at the left end E of the guide 44, as seen in Fig. 2.

The X-ray machine will now be turned on and the first exposure will be performed by projection of the X-rays for a predetermined number of seconds controlled by a timing mechanism in the X-ray machine. Reference may be had to the above mentioned Patent 2,476,776 for a description of this operation. After the exposure is completed, the carriage 22 will move the projection cone to a second position for photographing the patient's next molars. The carriage 22 is moved in steps around the path P. It will be noted that each time the carriage 22 moves, the rod 58 is raised or lowered depending on its position between the ends of the guide bar 44. The rod 58 raises or lowers the angular position of the cone 32 as indicated by dotted lines in Fig. 1, each time the carriage 22 moves. As the finger 55 of rod 58 moves along groove 50, bar 79 is moved angularly in a horizontal plane causing the plate 80 to travel in a U-shaped path on track 94. The gears 86 and 88 rotate. Shaft 83 slips in reel 106 but shaft 84 rotates reel 108 because of its engagement with pin 107. Thus, the takeup reel 108 is turned and the exposed film is wound on reel 108 and fresh unexposed film is moved to position F. The carriage 22 and cone 32 move through positions P1 and P2 and when they arrive at position P3 the rod 58 is in its lowermost position at the center B of groove 50 and the first eight pairs of teeth have been photographed. The cone 32 is then in its most tilted position. When the cariage 22 and cone 32 continue on in a series of eight steps to expose the last eight pairs of teeth in the denture, the rod 58 gradually raises the cone to reduce its angle of tilt. Each time the carriage 22 moves, the block 56 is drawn along by the tensioned cable 60. If the cable 60 were not employed, the finger 55 and block 56 would tend to bind in the groove 50, or on the guide bar 44.

The driving force of the cable insures positive coordinated movement of bar 79 with rod 58 and cone 32. As a result the film 110 is properly unwound from reel 106 and wound up on reel 108 in coordination with movement of carriage 22 and X-ray projection cone 32.

It will be noted that at no time need the film 110 be manually handled during its exposure. When the cycle of exposure is completed, the cone will be at position P4, the rod 58 will be at the end E' of the guide bar 44 and the film container will be located at the other end molars M' of the patient.

If the patient now opens his mouth, the track 94 can be removed and the container 100 can be removed from the track by disengaging same from plate 80 and shafts 83, 84. This completes the cycle and the X-ray film can now be developed in a darkroom in conventional manner upon removal from the container 100.

Another cycle can be started by setting the X-ray machine carriage 22 back to position P1, whereupon rod 58 will move to end E of guide bar 44. The gear assembly 85, 86 will be moved manually back to the left end of track 94 and will be ready for insertion of a fresh film container. It will be apparent that if the carriage 22 is moved directly to any desired position in its path P, then the film 110 will be unreeled to a corresponding position behind a corresponding pair of teeth. The teeth can then be X-ray photographed at this selected position. One or more or all teeth at the sixteen teeth positions of the patient can be photographed at will without requiring to photograph teeth of which pictures are not desired.

Fig. 15 shows an alternate form of gear arrangement, in which another gear 88$^a$ is provided on shaft 84. Both gears 88 and 88$^a$ will mesh with the rack gear 90 in track 94. With this arrangement, two rolls of film may be used simultaneously.

There has thus been provided according to the invention a device operative in coordination with a panoramic dental X-ray machine for holding, feeding, exposing, and reeling X-ray film. The film is wholly concealed in a package container opaque to ordinary light at all times during exposure. The film is exposed automatically without requiring attention of the patient or dentist once the device is properly set up for performing the X-ray operation. After film exposure, the container 100 is removed from the patient's mouth quickly and easily without any discomfort whatever.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A film feeding device for taking dental X-ray pictures comprising a U-shaped track disposable in a patient's mouth, a film reel holding means movably mounted on said track, a film container removably mounted on said holding means, said holding means comprising a pair of shafts, at least one gear attached to one of said shafts, said track being formed with a rack gear engaged by said one gear, said film container including an outer wrapper opaque to light and transparent to X-rays, a shell opaque to X-rays disposed within said shell to form a substantially closed chamber, said shell being formed with an opening to admit a beam of X-rays, a pair of reels rotatably mounted in said chamber, and a strip of film carried by said reels and feeding from one reel to the other past said opening in the shell.

2. A film feeding device for taking dental X-ray pictures, comprising a U-shaped guide member having a groove therein, a follower element movable in said groove to traverse said member from end to end of the groove, a U-shaped track disposable in a patient's mouth, film reel holding means movably mounted on said track, and means operatively connecting said element and holding means for driving said holding means along the track as said element is moved along said member.

3. A film feeding device for taking dental X-ray pictures, comprising a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, and a film container removably mounted on said holding means.

4. A film feeding device for taking dental X-ray pictures, comprising a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, and a film container removably mounted on said holding means, said holding means comprising a pair of shafts, at least one gear attached to one of said shafts, said track being formed with a rack gear engaged by said one gear.

5. A film feeding device for taking dental X-ray pictures, comprising a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, a film container removably mounted on said holding means, said holding means comprising a pair of shafts, at least one gear attached to one of said shafts, said track being formed with a rack gear engaged by said one gear, said film container including an outer wrapper opaque to light and transparent to X-rays, a shell opaque to X-rays disposed within said shell to form a substantially closed chamber, said shell being formed with an opening to admit a beam of X-rays, a pair of reels rotatably mounted in said chamber, and a strip of film carried by said reels and feeding from one reel to the other past said opening in the shell.

6. A film feeding device for taking dental X-ray pictures, comprising a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, there being motor means at one end of said member, and a flexible cable connecting said element and motor means for moving said element in the groove.

7. A film feeding device for taking dental X-ray pictures, comprising a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, there being spring motor means at one end of said member, and a flexible cable connecting said element and spring motor means for moving said element in the groove.

8. A film feeding device for taking dental X-ray pictures, comprising a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, a film container removably mounted on said holding means, said holding means comprising a pair of shafts, at least one gear attached to one of said shafts, said track being formed with a rack gear engaged by said one gear, said film container including an outer wrapper opaque to light and transparent to X-rays, a shell opaque to X-rays disposed within said shell to form a substantially closed chamber, said shell being formed with an opening to admit a beam of X-rays, a pair of reels rotatably mounted in said chamber, a strip of film carried by said reels and feeding from one reel to the other past said opening in the shell, there being motor means at one end of said member, and a cable connecting said element and said motor means for moving said element in the groove.

9. A device for taking dental X-ray pictures, comprising a panoramic dental X-ray machine having an X-ray projection cone movable in a U-shaped path, a U-shaped guide member having a groove therein, a follower element movable in said groove to traverse said member from end to end of the groove, a U-shaped track disposable in a patient's mouth, film reel holding means movably mounted on said track, and means operatively connecting said element and holding means for driving said holding means along the track as said element is moved along said member, there being a yoke carried by said element and connected to said cone for adjustably tilting the same during movement of said element in said groove, said groove having a concave curved bottom camming said element between elevated positions at ends of the groove and a lowered position at the center of the groove midway between its ends, whereby said cone is tilted during movement thereof.

10. A device for taking dental X-ray pictures, comprising a panoramic dental X-ray machine having an X-ray projection cone movable in a U-shaped path, a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, there being a yoke carried by said element and connected to said cone for adjustably tilting the same during movement of said element in said groove, said groove having a concave curved bottom camming said element between elevated positions at ends of the groove and a lowered position at the center of the groove midway between its ends, whereby said cone is tilted during movement thereof, and a film container removably mounted on said holding means.

11. A device for taking dental X-ray pictures, comprising a panoramic dental X-ray machine having an X-ray projection cone movable in a U-shaped path, a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, there being a yoke carried by said element and connected to said cone for adjustably tilting the same during movement of said element in said groove, said groove having a concave curved bottom camming said element between elevated positions at ends of the groove and a lowered position at the center of the groove midway between its ends, whereby said cone is tilted during movement thereof, and a film container removably mounted on said holding means, said holding means comprising a pair of shafts, at least one gear attached to one of said shafts, said track being formed with a rack gear engaged by said one gear.

12. A device for taking dental X-ray pictures, comprising a panoramic dental X-ray machine having an X-ray projection cone movable in a U-shaped path, a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, there being a yoke carried by said element and connected to said cone for adjustably tilting the same during movement of said element in said groove, said groove having a concave curved bottom camming said element between elevated positions at ends of the groove and a lowered position at the center of the groove midway between its ends, whereby said cone is tilted during movement thereof, a film container removably mounted on said holding means, said holding means comprising a pair of shafts, at least one gear attached to one of said shafts, said track being formed with a rack gear engaged by said one gear, said film container including an outer wrapper opaque to light and transparent to X-rays, a shell opaque to X-rays disposed within said shell to form a substantially closed chamber, said shell being formed with an opening to admit a beam of X-rays, a pair of reels rotatably mounted in said chamber, and a strip of film carried by said reels and feeding from one reel to the other past said opening in the shell.

13. A device for taking dental X-ray pictures, comprising a panoramic dental X-ray machine having an X-ray projection cone movable in a U-shaped path, a U-shaped guide member having a groove therein, a follower element movable in said groove to traverse said member from end to end of the groove, a U-shaped track disposable in a patient's mouth, film reel holding means movably mounted on said track, means operatively connecting said element and holding means for driving said holding means along the track as said element is moved along said member, there being a yoke carried by said element and connected to said cone for adjustably tilting the same during movement of said element in said groove, said groove having a concave curved bottom camming said element between elevated positions at ends of the groove and a lowered position at the center of the groove midway between its ends, whereby said cone is tilted during movement thereof, a film container removably mounted on said holding means, said holding means comprising a pair of shafts, at least one gear attached to one of said shafts, said track being formed with a rack gear engaged by said one gear, said film container including an outer wrapper opaque to light and transparent to X-rays, a shell opaque to X-rays disposed within said shell to form a substantially closed chamber, said shell being formed with an opening to admit a beam of X-rays, a pair of reels rotatably mounted in said chamber, a strip of film carried by said reels and feeding from one reel to the other past said opening in the shell, there being motor means at one end of said member, and a cable connecting said element and motor means for moving said element in said groove.

14. A device for taking dental X-ray pictures, comprising a panoramic dental X-ray machine having an X-ray projection cone movable in a U-shaped path, a U-shaped guide member having a groove therein, a follower element movable in said groove to traverse said member from end to end of the groove, a U-shaped track disposable in a patient's mouth, film reel holding means movably mounted on said track, and means operatively connecting said element and holding means for driving said holding means along the track as said element is moved along said member, there being a yoke carried by said element and connected to said cone for moving said element in said groove.

15. A device for taking dental X-ray pictures, comprising a panoramic dental X-ray machine having an X-ray projection cone movable in a U-shaped path, a U-shaped guide member having a groove therein, a follower element movable in said groove to traverse said member from end to end of the groove, a U-shaped track disposable in a patient's mouth, film reel holding means movably mounted on said track, and means operatively connecting said element and holding means for driving said holding means along the track as said element is moved along said member, there being a yoke carried by said element and connected to said cone for moving said element in said groove, there being motor means at one end of said member and a cable connecting said element and motor means for assisting said cone in moving said element in said groove.

References Cited in the file of this patent
UNITED STATES PATENTS

| | | |
|---|---|---|
| 2,476,776 | Smathers | July 19, 1949 |
| 2,684,446 | Paatero | July 20, 1954 |
| 2,847,580 | Arvanetakis et al. | Aug. 12, 1958 |